(12) United States Patent
Hudson et al.

(10) Patent No.: US 8,109,163 B2
(45) Date of Patent: Feb. 7, 2012

(54) ACTUATOR

(75) Inventors: Timothy Hudson, Market Drayton (GB); Benjamin Thomas Tucker, Wolverhampton (GB); Carl James Maxwell, Church Eaton (GB)

(73) Assignee: Goodrich Actuation Systems Limited, Solihull (GB)

( * ) Notice: Subject to any disclaimer, the term of this patent is extended or adjusted under 35 U.S.C. 154(b) by 580 days.

(21) Appl. No.: 11/858,243

(22) Filed: Sep. 20, 2007

(65) Prior Publication Data

US 2008/0072695 A1    Mar. 27, 2008

(30) Foreign Application Priority Data

Sep. 21, 2006   (GB) .................................. 0618572.2

(51) Int. Cl.
*F16H 29/02*   (2006.01)
(52) U.S. Cl. ...................................... 74/89.25
(58) Field of Classification Search ........... 74/89, 89.23, 74/89.25, 424.71
See application file for complete search history.

(56) References Cited

U.S. PATENT DOCUMENTS

| | | | |
|---|---|---|---|
| 4,276,967 A * | 7/1981 | Dowell et al. ................. | 188/134 |
| 4,745,815 A | 5/1988 | Klopfenstein | |
| 4,876,906 A | 10/1989 | Jones | |
| 5,092,539 A | 3/1992 | Caero | |
| 5,144,851 A | 9/1992 | Grimm et al. | |
| 5,214,972 A | 6/1993 | Larson et al. | |
| 5,313,852 A * | 5/1994 | Arena .......................... | 74/89.35 |

FOREIGN PATENT DOCUMENTS

| | | |
|---|---|---|
| EP | 1548327 | 6/2005 |
| GB | 2431215 | 4/2007 |

OTHER PUBLICATIONS

European Search Report dated Jan. 25, 2011.

* cited by examiner

*Primary Examiner* — Vicky Johnson
(74) *Attorney, Agent, or Firm* — Andrus, Sceales, Starke & Sawall, LLP

(57) ABSTRACT

An actuator comprises a first actuator arrangement operable to allow relative axial movement to occur between a first component and a second component, a second actuator arrangement operable to allow relative axial movement to occur between a third component and a fourth component, brake means operable to prevent extension of the first and/or second actuator arrangement, and damping means operable to control the rate of extension of at least one of the first and second actuator arrangements.

10 Claims, 4 Drawing Sheets

ACTUATOR

This invention relates to an actuator suitable for use in aerospace applications, and in particular to an electrically operated actuator having a failsafe operating mode.

It is common to use hydraulically powered actuators to drive movable components between, for example, stowed and operative positions. It is also common to provide redundancy or failsafe arrangements whereby, in the event of the failure of an actuator or the control system associated therewith, the movable components can still be moved to the operative positions.

A typical hydraulic actuator used to raise and lower the landing gear of an aircraft may include a switchable restricted flow path interconnecting the internal chambers of the actuator so that, in the event of a system failure, the landing gear can be allowed to move to a deployed position under the action of gravity forcing fluid to flow along the restricted flow path. The size of the restriction to flow formed by the restricted flow path determines the rate of movement of the landing gear and so provides a damping function.

It is desired to provide an electrically driven actuator suitable for use in such applications as the provision of electrically rather than hydraulically driven actuators reduces weight and complexity, improves reliability and the ability to monitor or sense operating parameters. It is a requirement of any such system that the ability to deploy the landing gear is maintained in the event of a failure or malfunction of the actuator or associated control system.

EP 1548327 describes an electrically powered ball-screw actuator in which a shaft provided with an external thread is arranged such that it is able to move axially, but is held against angular movement. A nut component is held against axial movement and is arranged to be driven for rotation by an electric motor. The nut component is internally threaded, and ball or roller components are located between the nut component and the shaft, engaging in the threads, such that rotation of the nut component under the control of the motor causes axial movement of the shaft, extending or retracting the actuator. Such an actuator does not include a failsafe operating mode.

U.S. Pat. No. 4,745,815 discloses an actuator having failsafe operating modes, the actuator comprising a main ball-screw type actuator, the screw shaft of which is hollow and is coupled to an inner component which, in turn, is coupled to a drive shaft to be driven by the actuator. The coupling between the screw shaft and the inner component is a screw threaded coupling. In normal use, the screw shaft and inner component are both held against rotation by respective brakes but are able to move axially. A nut of the main ball-screw actuator is rotatable by a motor. Rotation of the nut causes axial movement of the screw shaft, the inner component, and hence the drive shaft. If the ball-screw actuator becomes jammed, by releasing the brake used to hold the screw shaft against rotation, the nut and screw shaft can be driven, together, by the motor, causing the inner component, which is unable to rotate due to the operation of the associated brake, to translate axially. In the event of a motor failure or another failure preventing driven rotation of the nut, the brake preventing rotary movement of the inner component is released whilst that associated with the screw shaft is engaged. An external load applied to the drive shaft can then cause axial movement of the drive shaft, the inner component rotating relative to the screw shaft during such movement. Although such an arrangement provides a failsafe mode, there is no damping function to control or limit the speed of deployment.

Other forms of actuator having a failsafe mode are described in U.S. Pat. No. 5,092,539, U.S. Pat. No. 4,876,906 and U.S. Pat. No. 5,144,851.

According to the present invention there is provided an actuator comprising a first actuator arrangement operable to allow relative axial movement to occur between a first component and a second component, a second actuator arrangement operable to allow relative axial movement to occur between a third component and a fourth component, brake means operable to prevent extension of the first and/or second actuator arrangement, and damping means operable to control the rate of extension of at least one of the first and second actuator arrangements.

The first and second components may comprise the nut and shaft of a roller or ball-screw type actuator. The third and fourth components may, similarly, comprise the nut and shaft of a roller or ball-screw type actuator.

Such an actuator may be arranged, in normal use, such that one of the actuator arrangements is motor driven, the brake means preventing operation of the other actuator arrangement, the brake means being disengaged in a first failsafe mode to allow extension of the said other actuator arrangement, the damping means controlling the rate of extension of the actuator.

In a currently preferred embodiment, the second and third actuator components are secured to one another or integral with one another, forming an inner sleeve located between and co-operable with an outer sleeve and a shaft forming, respectively, the first and fourth components. The inner sleeve is conveniently keyed to a rod upon which part of the damping means is mounted such that the damping means damps rotation of the inner sleeve. The brake means is conveniently operable to lock the inner sleeve to the shaft, preferably by locking the rod to the shaft, for example by locking a component mounted for rotation with the rod to the shaft using a clutch arrangement, for example a dog clutch.

The damping means conveniently incorporates a ratchet mechanism whereby rotational movement of the rod in only one direction is damped.

The invention will further be described, by way of example, with reference to the accompanying drawings, in which.

Figure 1:
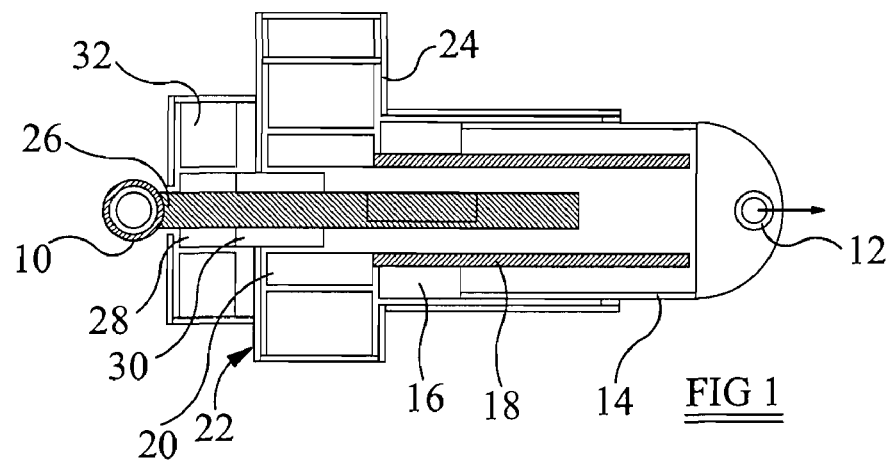
FIG. 1 illustrates, diagrammatically, an actuator in accordance with one embodiment of the invention in a retracted position.
Figure 2:
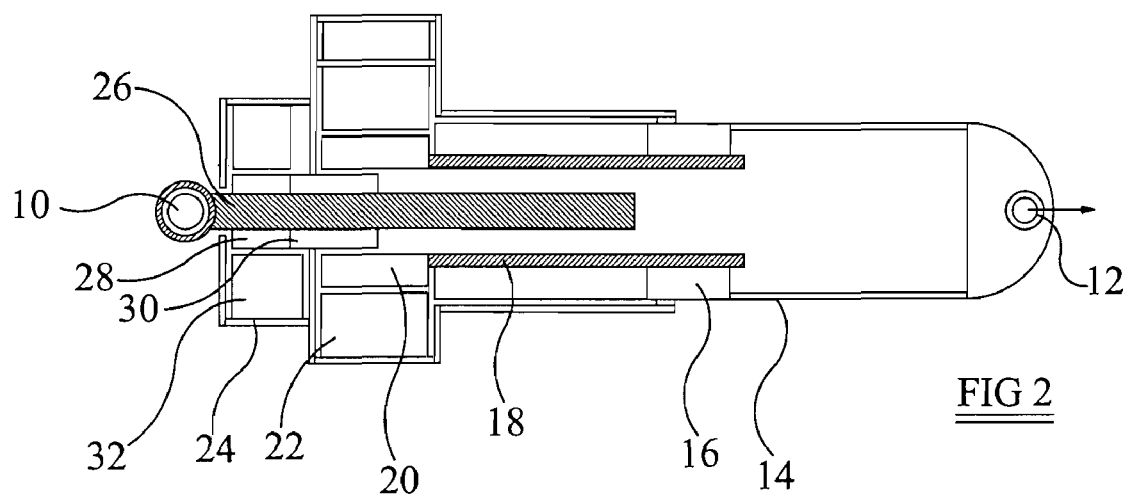
FIG. 2 illustrates the actuator of FIG. 1 in an extended position.
Figure 3:
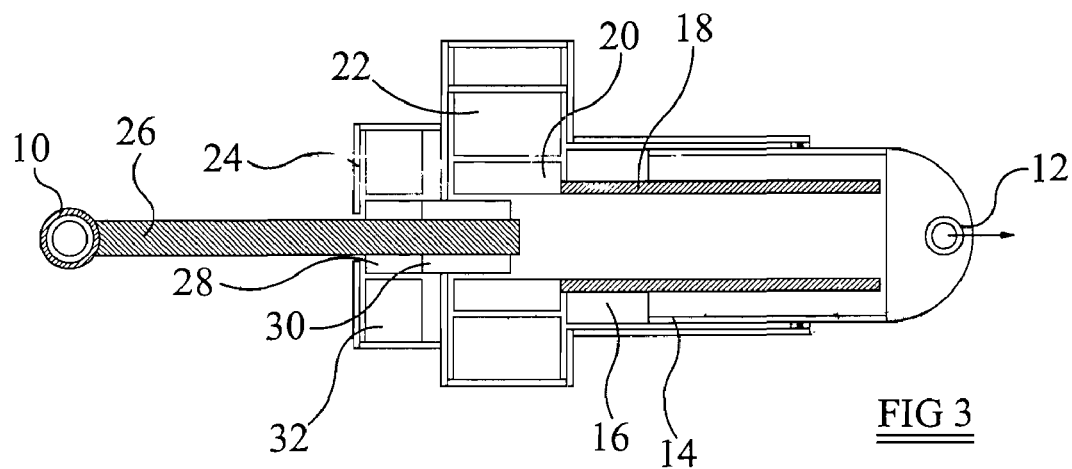
FIG. 3 illustrates the actuator of FIG. 1 in a failure mode extended position.

FIGS. 1 to 3 illustrate an electrically operated actuator intended for use in aerospace applications. Specifically, the actuator is intended for use in driving the landing gear of an aircraft between stowed and deployed positions. The actuator comprises a first mounting 10 arranged to be secured to the aircraft body, and a second mounting 12 intended to be attached to the landing gear to be moved using the actuator. The second mounting 12 is secured to a sleeve 14, the sleeve 14 being connected, at its end remote from the mounting 12, to a nut 16 provided with an internal thread. The nut 16 is arranged to co-operate, through a roller or ball-screw arrangement, with threads provided upon a shaft 18 secured to the rotor 20 of a motor 22. The nut 16 and shaft 18 form, with the balls or rollers located in the threads formed therein, first and second components of a first extendible actuator arrangement. The motor 22 is located within a non-rotatable housing 24 and, as illustrated in FIG. 1, the sleeve 14 extends through an opening formed in part of the housing 24. The housing 24, in addition to housing the motor 22, also incorporates electronic circuits used in controlling the operation of the motor 22 and other parts of the actuator.

The mounting 10 is connected to an end of a threaded shaft 26, an internally threaded nut 28 being mounted upon the shaft 26 via a second roller or ball-screw type coupling. The nut 28 and shaft 26 thus form components of a second extendible actuator arrangement. A mechanical lock or brake arrangement 30 carried by the housing 24 controls whether or not the nut 28 is permitted to rotate relative to the housing 24 at any given time. This may be controlled, for example, from the control circuitry located within the actuator or from an external control arrangement. A damping mechanism 32 is provided to control the rate of rotation of the nut 28 relative to the housing 24 in use.

In normal use, in order to move the actuator from the retracted position illustrated in FIG. 1 to the extended position in FIG. 2, the brake arrangement 30 is engaged to prevent rotation of the nut 28, and the motor 22 is operated to cause the rotor 20 thereof to rotate relative to the housing 24. The rotation of the rotor 20 is transmitted to the shaft 18, and the ball-screw connection between the shaft 18 and the nut 16 causes the nut to translate along the length of the shaft 18. It will be appreciated that rotation of the nut 16 is not permitted by virtue of the nature of the connection of the mounting 12 to the aircraft landing gear. Rotation of the shaft 18 under the control of the motor 22 continues until the actuator reaches its fully extended position or the landing gear is fully deployed as illustrated in FIG. 2. It will be appreciated that during this mode of operation, as the brake arrangement 30 is engaged to secure the nut 28 to the housing 24, the nut 28 is prevented from rotation, and hence axial movement of the nut 28 relative to the shaft 26 does not occur. In this mode of operation, as the nut 28 does not rotate, the damping mechanism 32 is inoperative, and any required control of the rate of movement of the landing gear towards its operative position is achieved through appropriate control of the motor 22.

Retraction of the actuator and raising of the landing gear to the stowed position is achieved by reversing the direction of rotation of the motor 22.

If it is determined that the actuator is not operating correctly, for example due to power failure or a failure in the motor 22 or its control arrangement or due to a jam between the shaft 18 and nut 16, then in order to allow the actuator to be moved to its extended position, and to move the landing gear to its operative position, the brake arrangement 30 is disengaged. Disengagement of the brake arrangement 30 permits the nut 28 to rotate relative to the housing 24 due to the application of a tensile loading to the actuator by the effects of gravity acting on the landing gear, the loading being transmitted to the housing 24 through the sleeve 14, nut 16, shaft 18 and motor 22. The threaded nature of the connection between the nut 28 and the shaft 26 results, in the event of the application of such a tensile load when the brake arrangement is released, in the nut 28 translating along the length of the shaft 26. The translation of the nut 28 along the length of the shaft 26 results in the housing 24, and hence the motor 22, shaft 18 and nut 16, and the mounting 12 being moved towards the failsafe mode extended condition shown in FIG. 3.

It will be appreciated that the landing gear of an aircraft has significant mass and is thus capable of deployment under the effects of gravity, as indicated above, at an undesirably high rate of movement. In order to permit control over the rate of extension of the actuator, and hence to permit control over the rate of movement of the aircraft landing gear, the damping mechanism 32 is arranged to limit the maximum rate of rotation of the nut 28 upon the shaft 26. Although a range of damping mechanisms could be used, it is currently envisaged that the damping mechanism 32 will take the form of a passive magnetic or eddy current damping device. For example, the damping mechanism may make use of samarium cobalt or other rare earth permanent magnets. However, other possibilities include the use of a simple friction brake.

Figure 10:
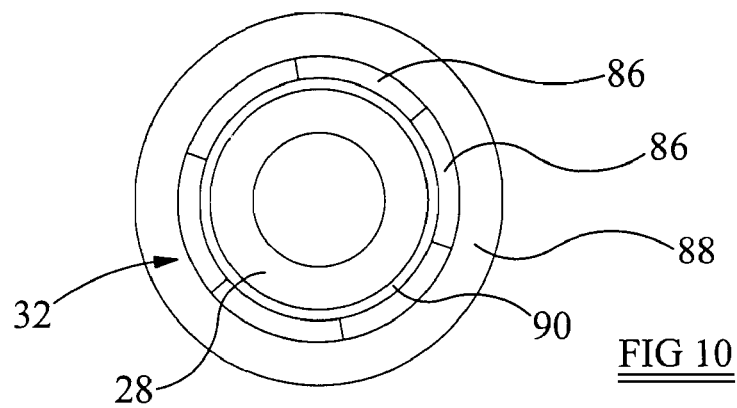
FIG. 10 illustrates, diagrammatically, a damping mechanism.

One form of damping mechanism 32 is illustrated in FIG. 10 and comprises a series of samarium cobalt magnets 86 secured to a body 88, in this case of annular form, which is non-rotatably secured to the housing 24. Adjacent the magnets 86 is located a copper sleeve 90 mounted upon the nut 28 so as to be rotatable therewith. In use, relative rotation between the nut 28 and the housing 24, and hence between the sleeve 90 and magnets 86 induces eddy currents in the sleeve 90, and this effect can be used to limit the maximum rate of relative rotation, and thus the rate of extension of the actuator.

Figure 4:
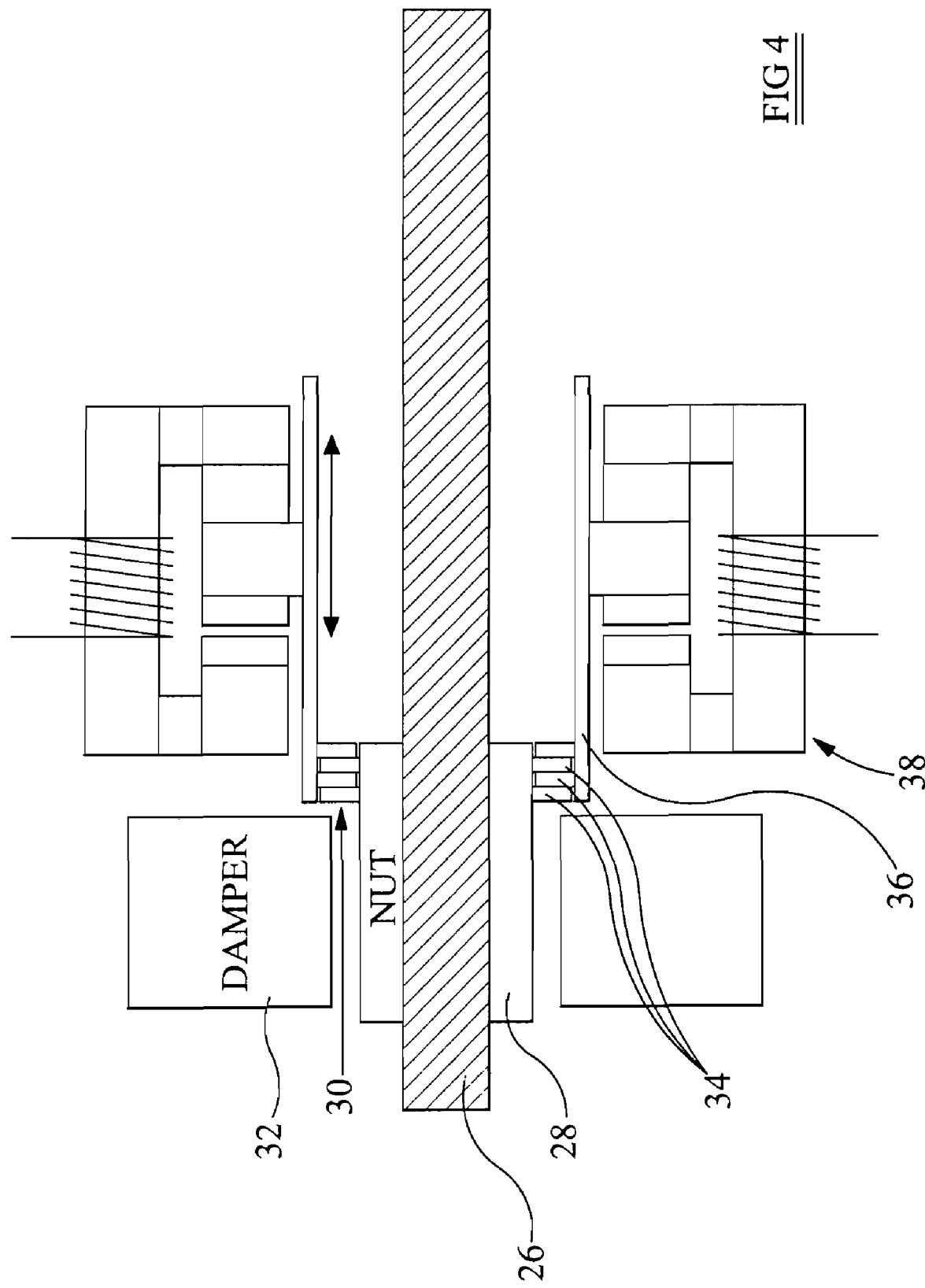
FIG. 4 illustrates the brake arrangement of the actuator of FIG. 1.

As illustrated in FIG. 4, the brake arrangement 30 may incorporate a plurality of annular brake discs 34, some of which are secured to the nut 28 whilst others are secured to a sleeve 36 movable by an electromagnetic actuator 38 to control the frictional forces between the discs 34. The actuator 38 could be a bi-stable actuator, having the advantage that power is only consumed when the actuator is switched between its stable states. Another possibility is to use a power-on brake arrangement, the brake being released when power is removed. This has the advantage that, in the event of a power failure or interruption, the brake arrangement will be released automatically thereby enabling movement of the landing gear to the deployed position.

In summary, in this embodiment, in normal use, the brake arrangement 30 prevents extension of the second actuator, movement of the landing gear being achieved under the control of the first actuator. In a failsafe mode, the first actuator and motor are not used and instead the brake arrangement is released and movement is achieved by the action of gravity causing extension of the second actuator. During this movement the rate of extension is damped by the damping mechanism.

Turning to the embodiment illustrated in FIGS. 5 to 9 there is illustrated an actuator comprising an outer sleeve 40 carrying a mounting arrangement 42 for securing the outer sleeve 40 to part of the movable landing gear of an aircraft. The sleeve 40 carries a nut 44 co-operable via a roller or ball-screw coupling with a threaded inner sleeve 46 such that rotation of the inner sleeve 46 causes the nut 44 and outer sleeve 40 to translate along the length of the inner sleeve 46 resulting in axial extension of the actuator and hence in movement of the landing gear with which the actuator is associated. The nut 44 and inner sleeve 46 together form a first actuator arrangement, conveniently in the form of a roller or ball-screw actuator arrangement.

The inner sleeve 46 further defines an integral nut region 48 which co-operates with a thread formed on a shaft component 50 such that relative rotation between these components causes the inner sleeve 46 to translate along the length of the shaft 50. Again, the nature of the co-operation between the region 48 and the shaft 50 is preferably in the form of a roller or ball-screw actuator arrangement, the region 48 and shaft 50 together forming a second actuator arrangement.

The shaft 50 is hollow and an elongate rod 52 extends through the shaft 50, the rod 52 being connected by a spline arrangement 54 to the inner sleeve 46, the spline arrangement 54 permitting axial movement of the inner sleeve 46 relative to the rod 52, but preventing relative rotation between the rod 52 and the inner sleeve 46.

The actuator further comprises a housing 56 in which an electrically operated motor 58 is provided, the motor 58 having a rotor 60 secured to the shaft 50 such that the motor 58 can drive the shaft 50 for rotation, bearings 62 securing the shaft 50 against axial movement.

Figure 5:
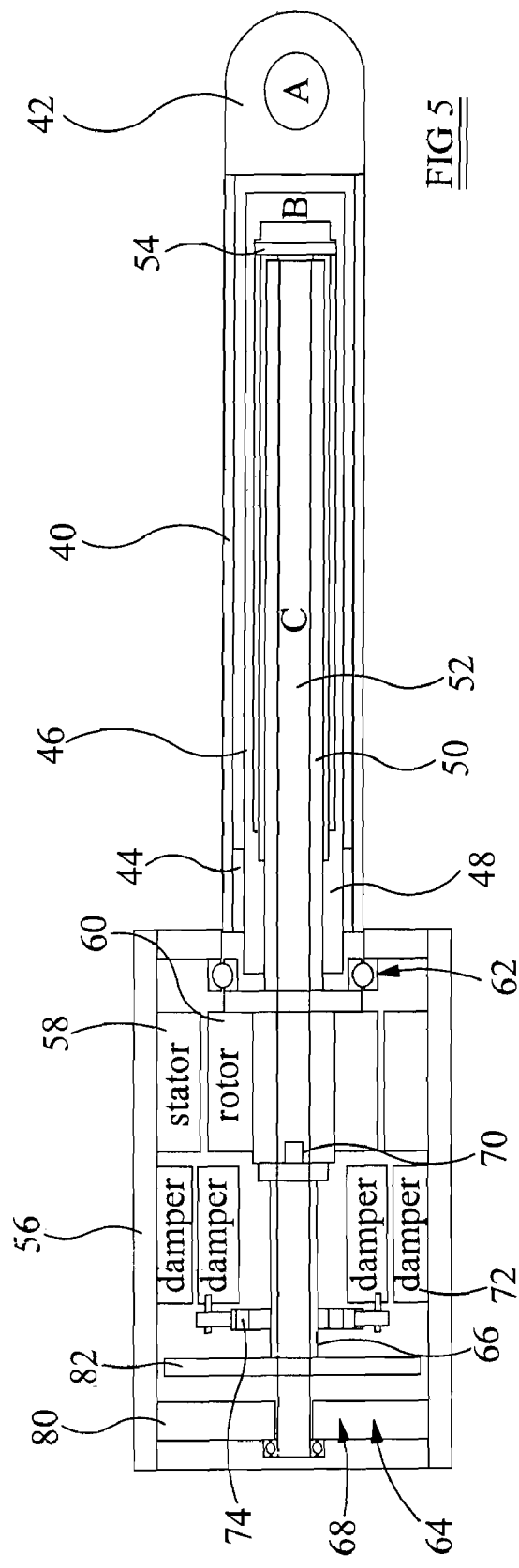
FIGS. 5 and 6 illustrate an actuator in accordance with a second, currently preferred embodiment of the invention in a retracted position.
Figure 6:
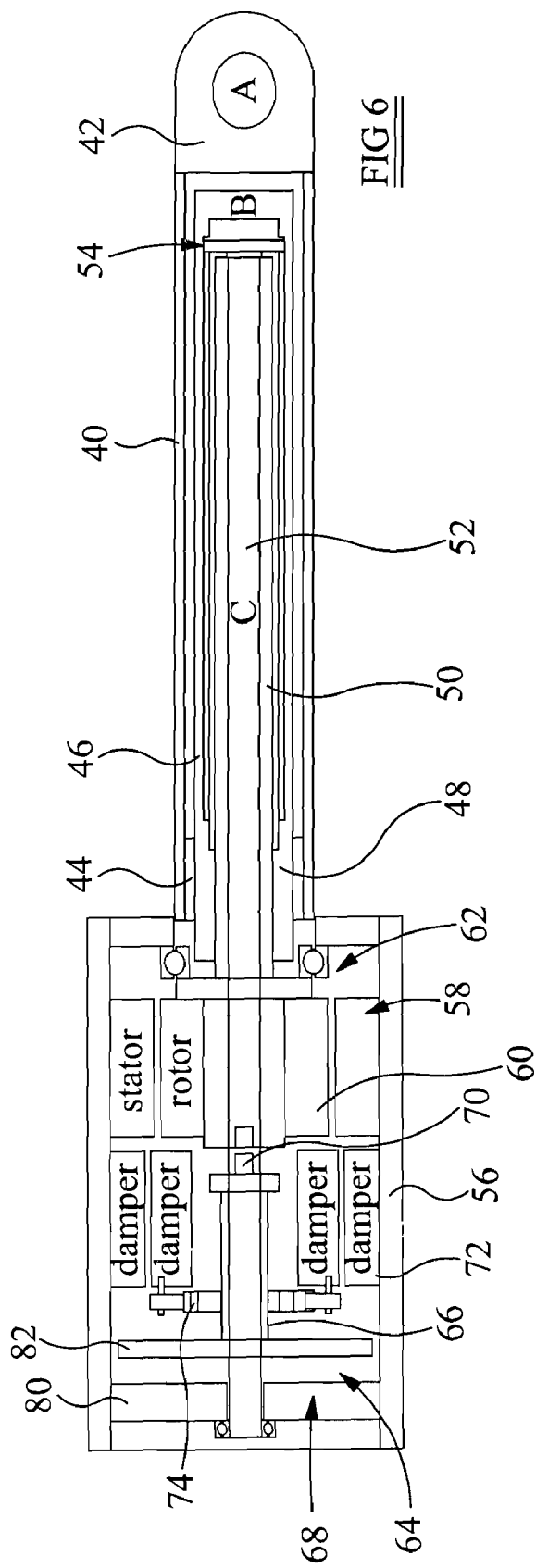

Also located within the housing 56 is a brake or lock arrangement 64. The arrangement 64 comprises a lock component 66 which keyed to the rod 52 so as to be unable to rotate relative thereto, but which is capable of moving axially relative to the rod 52. An electro magnetic actuator arrangement 68 comprising an electromagnet 80 and a displaceable armature 82 fixed to the lock component 66 is provided to move the component 66 axially relative to the rod 52. At one end, the component 66 is arranged to abut the shaft 50, the component 66 being provided with formations 70 co-operable within correspondingly shaped recesses formed in the shaft 50 to form a clutch arrangement. In this embodiment the clutch arrangement comprises a dog clutch but it will be appreciated that other forms of clutch arrangement could be used. FIG. 5 illustrates the actuator with the dog clutch engaged, FIG. 6 illustrating the actuator with the dog clutch disengaged through appropriate operation of the actuator arrangement 68. It will be appreciated that with the dog clutch engaged as illustrated in FIG. 5, the inner sleeve 46 and rod 52 are secured against rotation relative to the shaft 50. With the dog clutch disengaged as illustrated in FIG. 6, relative rotation between the rod 52 (and hence the inner sleeve 46) and the shaft 50 is permitted.

The housing 56 further houses a damper mechanism or arrangement 72 arranged to damp rotational movement of the component 66, and hence the rod 52 and inner sleeve 46. The damper arrangement 72 incorporates a ratchet 74 such that rotational movement of the component 66 in only one rotary direction is damped.

Figure 7:
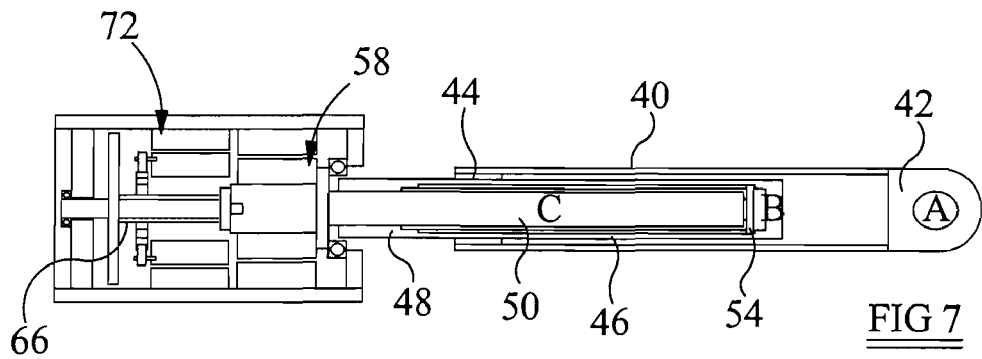
FIGS. 7 to 9 illustrate the actuator of FIGS. 5 and 6 in three different modes of operation.

Referring to FIG. 7, in normal use the actuator arrangement 68 is operated to ensure that the dog clutch is engaged. Consequently, the shaft 50, rod 52 and inner sleeve 46 are locked together against relative rotation. Operation of the motor 58 to cause rotation of the shaft 50 is thus transmitted to the inner sleeve 46. The rotation of the inner sleeve 46 relative to the outer sleeve 40, which is fixed against rotation by virtue of its connection to the landing gear, causes the nut 44 to translate along the length of the inner shaft 46, extending the actuator. During this movement, the component 66 rotates, and the damper arrangement 72 operates to damp rotational movement of the component 66, thereby assisting the motor in limiting the rate of extension of the actuator. To retract the actuator, the motor 58 is driven in the reverse direction. In this direction of rotation the ratchet arrangement 74 operates to ensure that such rotation of the motor 58 is not damped, and the rotation causes the sleeve 40 to return to the position illustrated in FIG. 5, retracting the associated landing gear.

Figure 8:
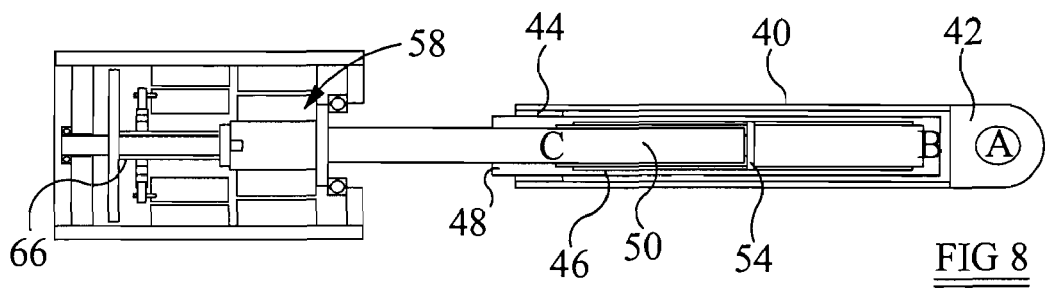

FIG. 8 illustrates a first failsafe mode, where the outer sleeve 40 has become jammed relative to the inner sleeve 46, for example due to a failure in the ball-screw connection between the nut 44 and the inner sleeve 46. It will be appreciated that in the event of such a failure, relative rotation between the inner sleeve 46 and the outer sleeve 40 is no longer possible. In order to allow the actuator to be moved from its retracted position to its extended position, the lock arrangement 64 is operated to disengage the dog clutch. Such operation of the lock arrangement 64 permits relative rotation to occur between the shaft 50 and the inner sleeve 46 under the control of the motor 58. Thus, operation of the motor 58 can be used to drive the shaft 50 for rotation. The relative rotation between the shaft 50 and the inner sleeve 46 causes the inner sleeve 46 to translate along the length of the shaft 50, moving the actuator towards an extended position. Rotation of the motor 58 in the reverse direction can be used to retract the actuator. It will be appreciated that in this mode of operation, as the inner sleeve 46 and the rod 52 do not rotate, the damper arrangement 72 is inoperative and the rate of deployment is controlled solely by the motor 58.

The failsafe mode illustrated in FIG. 8 can also be used in the event of the damper arrangement 72 becoming jammed. In this mode of operation, the jammed damper arrangement 72 would hold the component 66, and thus the rod 52 against rotation. As the rod 52 is secured by the spline arrangement 54 to the inner sleeve 46, the inner sleeve 46 is also held against rotation. It will be appreciated that in these circumstances release of the brake 64 and, rotation of the motor 58 will cause operation of the actuator in the manner described hereinbefore.

It will be appreciated that in the event of a failure resulting in the inner sleeve 46 becoming jammed on the shaft 50, for example due to a failure in the ball-screw connection therebetween, then the actuator can continue to operate in the manner illustrated in FIG. 7 as such operation does not require relative rotation between these components.

Figure 9:
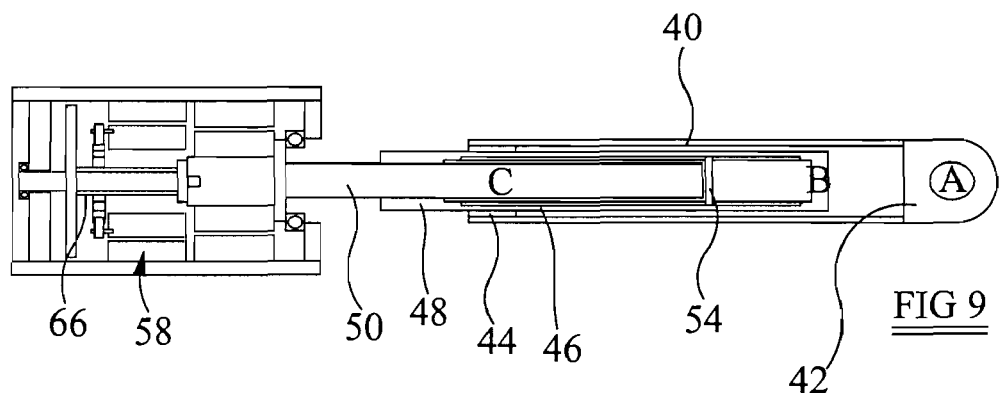

FIG. 9 illustrates a further failsafe mode in which the motor 58 is inoperative or jammed, the bearings 62 have failed, or the shaft 50 is otherwise no longer capable of rotation. In such circumstances, the actuator arrangement 68 is operated to release the dog clutch and thereby permit relative rotation to occur between the inner sleeve and the shaft 50 allowing the actuator to extend due to the effects of gravity acting upon the landing gear. The gravitational forces acting upon the landing gear will apply a force to the outer sleeve 40 pulling the outer sleeve 40 towards its extended position. Under normal operation, it will be appreciated that these loadings are borne by the motor 58 and/or the damper arrangement 72. As illustrated in FIG. 9, it will be appreciated that the outer sleeve 40 and the shaft 50 are both held against rotation, the shaft 50 being held against rotation by virtue of the effects of the failure and the outer sleeve 40 being held against rotation due to its connection to the associated landing gear. To allow the outer sleeve 40 to move to its extended position, the inner sleeve 46 is caused to rotate relative to both the outer sleeve 40 and the shaft 50. Such movement is permitted by the ball-screw connections between the inner sleeve 46 and both the outer sleeve 40 and the shaft 50. The rotation of the inner sleeve 46 is transmitted to the rod 52 and component 66 of the lock arrangement. The damper 72 serves to limit the rate of rotation of the component 66 and hence of the rod 52 and inner sleeve 46, thus the damper 72 serves to limit the rate of extension of the actuator.

As the operating mode illustrated in FIG. 9 relies upon the effects of gravity to cause the actuator to move to its extended position, it will be appreciated that retraction of the actuator is not possible.

As with the arrangement described with reference to FIGS. 1 to 4, it will be appreciated that a number of modifications and alterations may be made to the arrangement described hereinbefore without departing from the scope of the invention. For example, the specific nature of the damping mechanism 72 may be modified. Further, the nature of the ratchet mechanism 74 may be changed. Another possibility is to modify the nature of the lock arrangement.

The invention claimed is:

1. An actuator comprising a first, motor driven actuator arrangement and a second actuator arrangement, the first actuator arrangement comprising a first component and a second component and being operable to allow relative axial movement to occur therebetween, the second actuator arrangement comprising a third component and a fourth component and being operable to allow relative axial movement to occur therebetween independently of the operation of the first actuator arrangement, brake means operable to prevent extension of the second actuator arrangement, and damping means operable to control the rate of extension of the second actuator arrangement;

wherein the second and third components are secured to one another or integral with one another, forming an inner sleeve located between and co-operable with an outer sleeve and a shaft forming, respectively, the first and fourth components, and wherein the inner sleeve is keyed to a rod upon which part of the damping means is mounted such that the damping means damps rotation of the inner sleeve.

2. An actuator according to claim 1, wherein the first and second components comprise the nut and shaft of a roller or ball-screw actuator.

3. An actuator according to claim 1, wherein the third and fourth components comprise the nut and shaft of a roller or ball-screw actuator.

4. An actuator according to claim 1, wherein the brake means is operable to lock the inner sleeve to the shaft.

5. An actuator according to claim 4, wherein the brake means is operable to lock the rod to the shaft.

6. An actuator according to claim 5, wherein the rod is lockable to the shaft by locking a component mounted for rotation with the rod to the shaft using a clutch arrangement.

7. An actuator according to claim 6, wherein the clutch arrangement comprises a dog clutch.

8. An actuator according to claim 1, wherein the damping means incorporates a ratchet mechanism whereby rotational movement in only one direction is damped.

9. An actuator according to claim 1, wherein the damping means comprises a plurality of magnets located around a rotatable copper sleeve.

10. An actuator according to claim 9, wherein the magnets comprise samarium cobalt magnets.

* * * * *